(12) United States Patent
Burns et al.

(10) Patent No.: US 10,192,349 B2
(45) Date of Patent: *Jan. 29, 2019

(54) TEXTURE SAMPLING TECHNIQUES

(71) Applicant: Apple Inc., Cupertino, CA (US)

(72) Inventors: Christopher A. Burns, Austin, TX (US); Justin A. Hensley, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/870,081

(22) Filed: Jan. 12, 2018

(65) Prior Publication Data

US 2018/0137670 A1 May 17, 2018

Related U.S. Application Data

(63) Continuation of application No. 15/018,252, filed on Feb. 8, 2016, now Pat. No. 9,905,040.

(51) Int. Cl.
*G06T 15/00* (2011.01)
*G06T 15/04* (2011.01)
*G06T 15/06* (2011.01)

(52) U.S. Cl.
CPC ............ *G06T 15/04* (2013.01); *G06T 15/005* (2013.01); *G06T 15/06* (2013.01); *G06T 2210/36* (2013.01)

(58) Field of Classification Search
CPC ..... G06T 15/005; G06T 15/006; G06T 15/06; G06T 2210/36; G06T 15/04
See application file for complete search history.

(56) References Cited

U.S. PATENT DOCUMENTS

| 7,502,035 B1 | 3/2009 | Moreton |
| 7,561,165 B2 | 7/2009 | Strassenburg-Kleciak et al. |
| 8,223,157 B1 | 7/2012 | Baldwin et al. |
| 8,941,660 B2 | 1/2015 | Ishibashi |
| 9,659,402 B2 | 5/2017 | Seiler |
| 2014/0043342 A1 | 2/2014 | Goel et al. |
| 2014/0333621 A1 | 11/2014 | Hillesland et al. |
| 2015/0130826 A1 | 5/2015 | Peng et al. |

OTHER PUBLICATIONS

Peter Shirley, et al., "Discrepancy as a Quality Measure for Sample Distributions," Proceedings of Eurographics 91, Jun. 1991, pp. 183-193.

(Continued)

*Primary Examiner* — Robert J Craddock
(74) *Attorney, Agent, or Firm* — Meyertons, Hood, Kivlin, Kowert & Goetzel, P.C.

(57) ABSTRACT

Techniques are disclosed relating to texture sampling operations. In some embodiments, multi-fetch sampling instructions specify a region of a texture in which multiple samples are to be performed and texture processing circuitry is configured to sample the texture multiple times within the region. In some embodiments, the locations of the samples are determined according to a formula, which may be pseudo-random. In some embodiments, the locations of the samples are jittered to produce stochastic results. In some embodiments, the locations of the samples are determined based on one or more stored sets of samples that have particular properties (e.g., blue noise, in some embodiments). In various embodiments, disclosed techniques may facilitate Monte Carlo sampling.

20 Claims, 8 Drawing Sheets

(56) References Cited

OTHER PUBLICATIONS

Jiating Chen, et al., "Bilateral Blue Noise Sampling," ACM Transactions on Graphics (TOG)—Proceedings of ACM SIGGRAPH Asia 2013, vol. 32, Issue 6, Article No. 216, Nov. 2013, 11 pages.
Peter Shirley, et al., "A Low Distortion Map Between Disk and Square," Journal of Graphics Tools, vol. 2, Issue 3, 1997, pp. 45-52.
Morgan McGuire, et al., "Scalable Ambient Obscurance," High Performance Graphics, The Eurographics Association 2012, 7 pages.
Johannes Kopf, et al., "Recursive Wang Tiles for Real-Time Blue Noise," CM Transactions on Graphics (TOG)—Proceedings of ACM SIGGRAPH 2006, vol. 25, Issue 3, Jul. 2006, pp. 509-518.
Office Action in U.S. Appl. No. 15/018,252 dated Jul. 24, 2107, 11 pages.

TEXTURE SAMPLING TECHNIQUES

This application is a continuation of U.S. application Ser. No. 15/018,252, filed on Feb. 8, 2016, which is incorporated by reference herein in its entirety.

BACKGROUND

Technical Field

This disclosure relates generally to graphics processing and more specifically to texture sampling.

Description of the Related Art

Graphics textures are commonly used to render scenes for display. Textures are typically stored images that are "wrapped around" the surfaces of objects in a scene being rendered and represent a continuous function whose value is known only at the stored locations, which are called "texels." The determination of which texels contribute to which parts of a rendered surface is typically referred to as texture mapping. Once the mapping of a given pixel in screen space to coordinates in a texture is determined, values of nearby texels in the texture are typically used to determine values for the pixel. This process is referred to as sampling and may involve the application of various filters to determine pixel attributes based on multiple texels (e.g., bi-linear, bi-cubic, etc.).

Often, to approximate an area sample over a domain, the texture function is sampled a number of times in the domain. This may be performed within a loop of graphics instructions, for example, where each loop iteration samples a texture and the results are aggregated (e.g., using a weighted average). Development of sample distributions that minimize approximation error while avoiding structured artifacts is an active research area.

Graphics circuitry that facilitates sampling techniques that utilize multiple samples within a region may be desired.

SUMMARY

Techniques are disclosed relating to texture sampling operations. In some embodiments, multi-fetch sampling instructions specify a region of a texture in which multiple samples are to be obtained and texture processing circuitry is configured to sample the texture multiple times within the region. In some embodiments, the locations of the samples are determined according to a formula, which may be pseudo-random. In some embodiments, the locations of the samples are jittered to produce stochastic results. In some embodiments, the locations of the samples are determined based on one or more stored sets of samples that have particular properties (e.g., low discrepancy, in some embodiments). In some embodiments, sample attributes and/or sample locations are streamed, as they are generated, to storage elements that are accessible to a shader program. In some embodiments, the texture processing circuitry is configured to perform one or more operations on the samples, such as weighted integration, before returning results to a shader program. In various embodiments, disclosed techniques may facilitate Monte Carlo integration, among other sampling techniques.

Figure 1A:
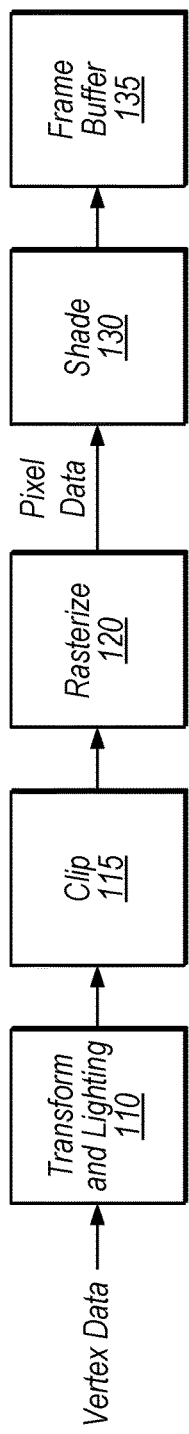
FIG. 1A is a block diagram illustrating an exemplary graphics processing flow.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Figure 1B:
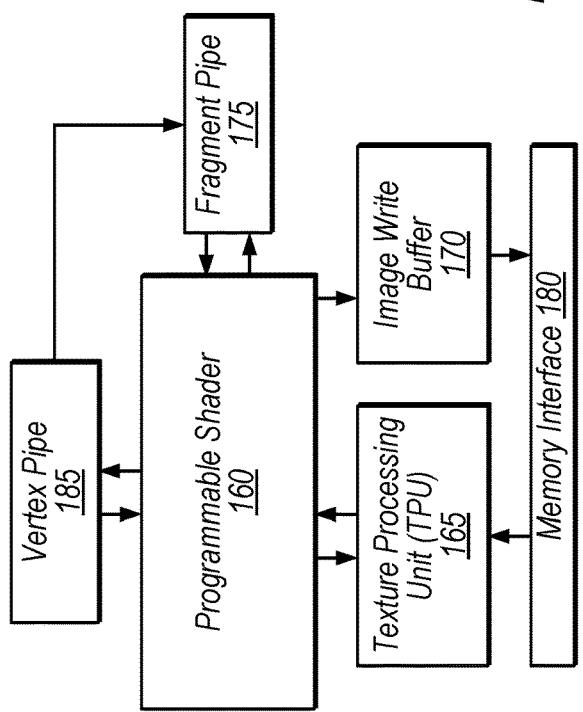
FIG. 1B is a block diagram illustrating one embodiment of a graphics unit.
Figure 5:
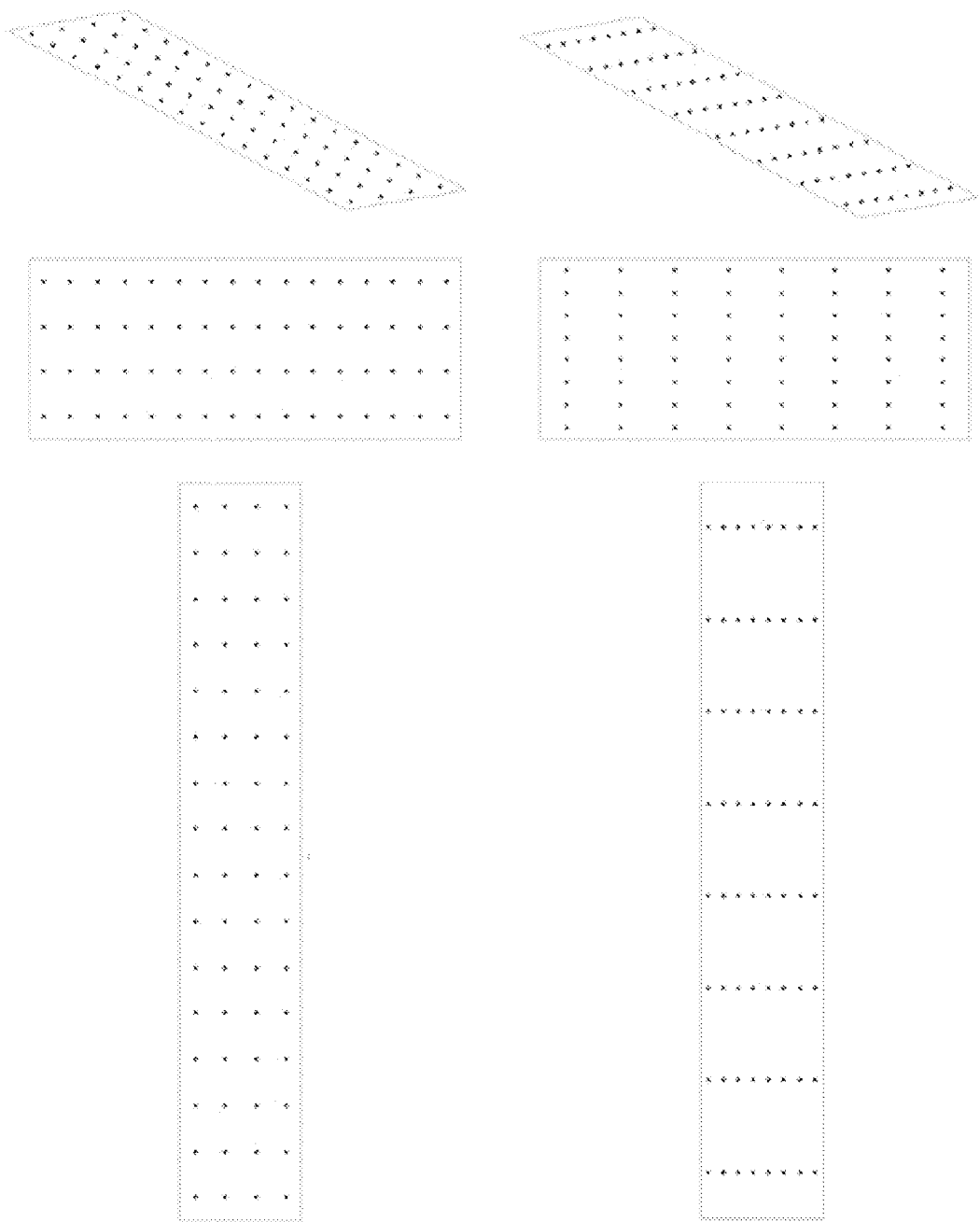
FIG. 5 illustrates results of an exemplary transform operation, according to some embodiments.
Figure 6:
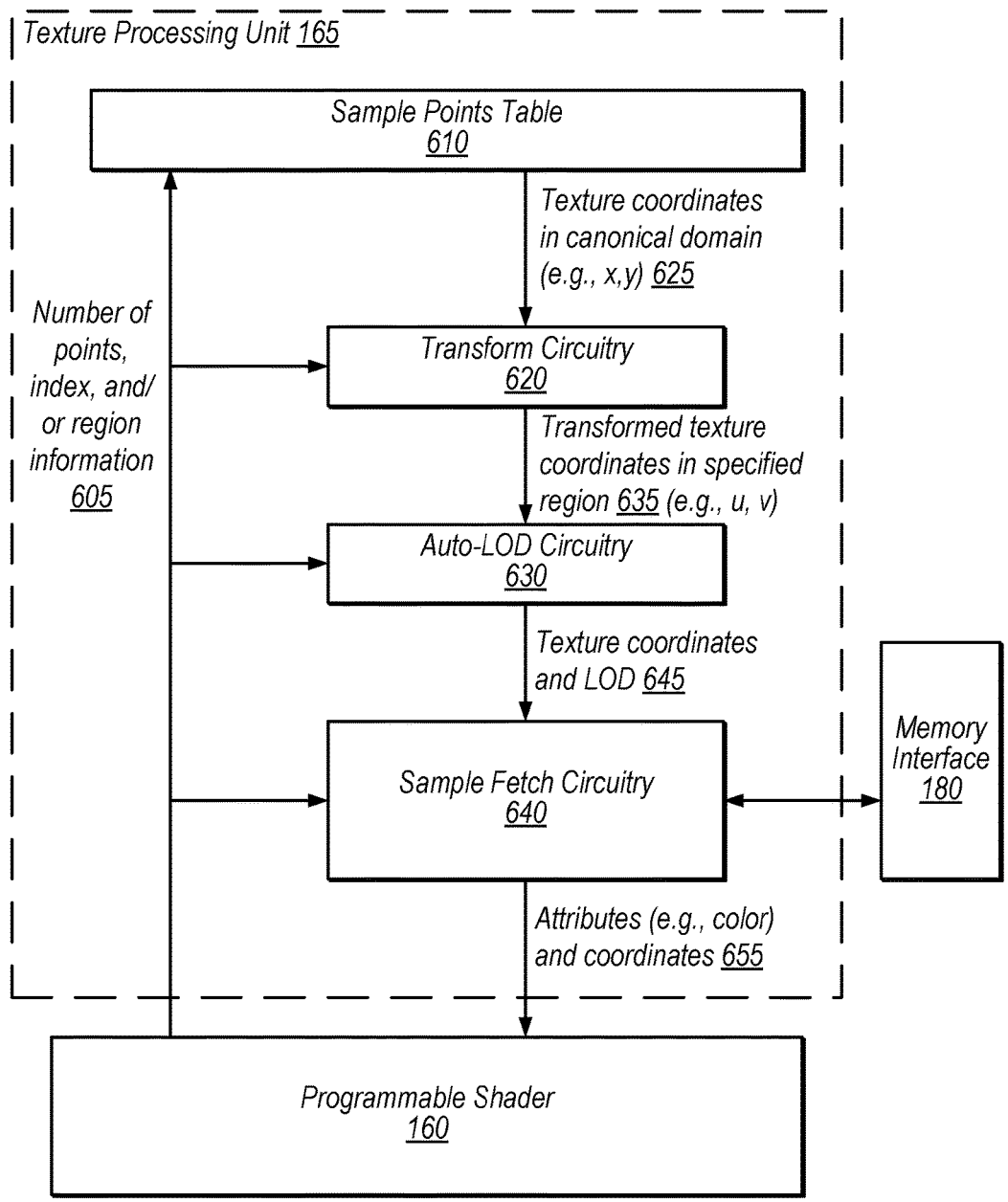
FIG. 6 is a block diagram illustrating exemplary components of a texture processing unit, according to some embodiments.
Figure 7:
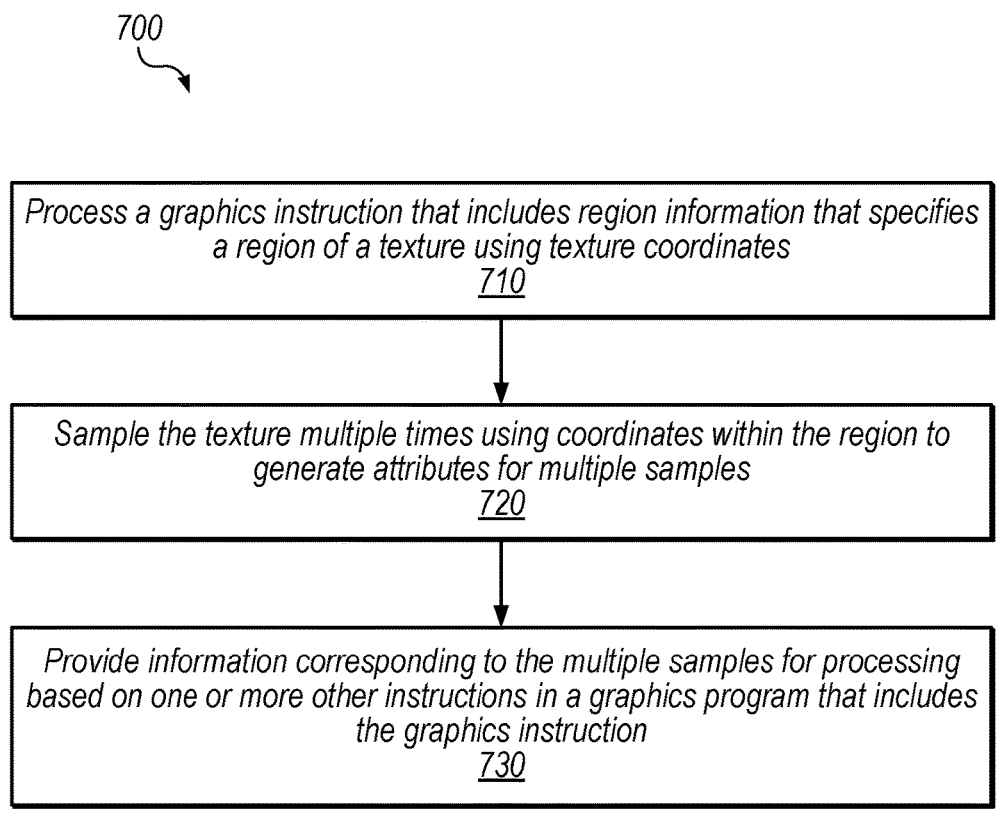
FIG. 7 is a flow diagram illustrating one embodiment of a method for performing multi-fetch sample operations.
Figure 8:
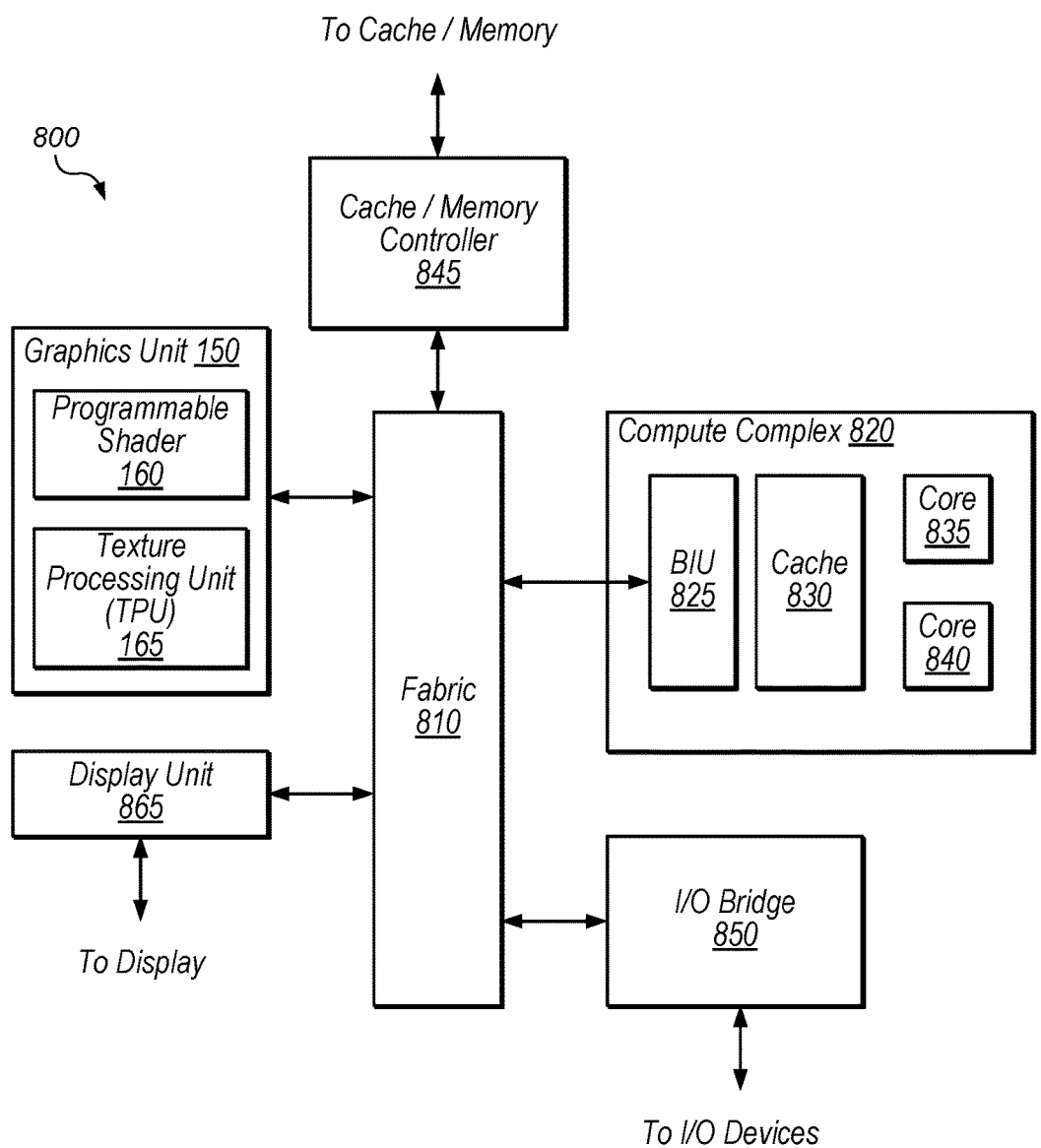
FIG. 8 is a block diagram illustrating an exemplary embodiment of a device.

This disclosure initially describes, with reference to FIGS. 1A-1B, an overview of a graphics processing flow and an exemplary graphics unit. Embodiments of multi-fetch techniques for sample instructions are shown with reference to FIGS. 2A-3C. Embodiments of techniques for using predetermined sample points and performing transforms are discussed with reference to FIGS. 4-5. Exemplary texture processing circuitry and an exemplary method are shown in FIGS. 6-7. FIG. 8 illustrates an exemplary device. In various embodiments, the disclosed techniques may facilitate and/or improve Monte Carlo sampling techniques, for example.

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments or pixels within each polygon and assigning initial color values for each fragment, e.g., based on texture coordinates of the vertices of the polygon. Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Referring now to FIG. 1B, a simplified block diagram illustrating one embodiment of a graphics unit 150 is shown. In the illustrated embodiment, graphics unit 150 includes programmable shader 160, vertex pipe 185, fragment pipe 175, texture processing unit (TPU) 165, image write buffer 170, memory interface 180, and texture state cache 190. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in the illustrated embodiment, is configured to store processed tiles of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The exemplary embodiment of FIG. 1B shows one possible configuration of a graphics unit 150 for illustrative purposes.

In some embodiments, graphics unit 150 is configured to implement multi-sample anti-aliasing (MSAA) in which multiple locations for each pixel are evaluated to determine whether they intersect a graphics primitive and whether the pixel should be shaded based on the primitive. MSAA is distinct from techniques described in further detail below, and may or may not be utilized in conjunction with these techniques. Subsequently during pixel shading, in some embodiments, TPU 165 is configured to support multi-fetch operations, as discussed in further detail below.

Exemplary Sample Requests

Figure 2A:
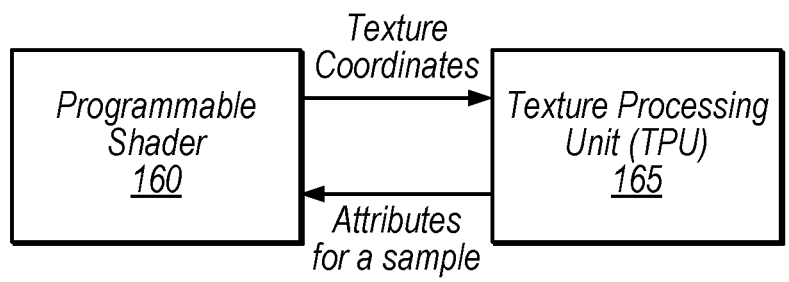
FIGS. 2A and 2B are block diagrams illustrating communications between a programmable shader and a texture processing unit, according to some embodiments.

FIG. 2A is a block diagram that illustrates exemplary communications for a sample operation between programmable shader 160 and TPU 165. In the illustrated embodiment, programmable shader 160 sends a sample request with texture coordinates to TPU 165. The texture coordinates may be (u,v) coordinates for a two-dimensional texture, for example. In some embodiments, the texture coordinates may also include a level of detail (LOD), e.g., for textures in which mipmapping is used. Mipmapping involves using pre-determined copies of a texture with progressively lower resolution, which may increase rendering speed and reduce aliasing artifacts. A LOD is used to identify a particular level (or fractional level) in the mipmap. The request may include various other information such as a texture identifier, filtering information, etc.

For example, an OpenGL graphics program may include sampler instructions based on the following function prototype:

gvec texture(gsampler sampler, vec texCoord[, float bias]);

that returns sample information (e.g., R,B,G,A color attributes) as a gvec, when provided with a sample parameter and texture coordinates (with an optional bias parameter). In other graphics application programming interfaces (APIs), various other sampling functions or instructions may be implemented.

In the illustrated embodiment, TPU 165 samples the texture using the provided coordinates (which may include filtering based on sampler parameters, for example) and provides attributes for a sample (e.g., color attributes) back to the programmable shader. The graphics program on the programmable shader may then perform further processing using these attributes (e.g., by integrating the attributes with other sample for Monte Carlo techniques).

A conventional shader program might include program instructions similar to the following pseudocode:

```
color = 0.0f;
for i=0; i<N; i++ {
    color += sample (u[i],v[i]) * weight[i]
}
``` where u and v are arrays of coordinates and weight is an array of weights. In embodiments discussed below, the serialized texture sample requests may be replaced with a single multi-fetch operation that specifies a region from which multiple samples are desired.

Figure 2B:
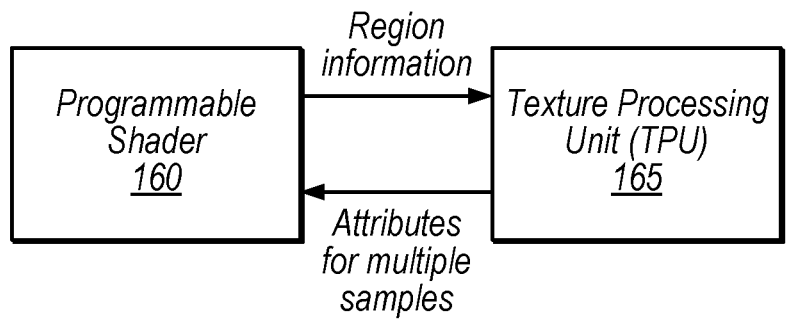

FIG. 2B is a block diagram that illustrates exemplary communications for a multi-fetch sample operation between programmable shader 160 and TPU 165. In some embodiments, TPU 165 is configured to perform multi-fetch operations in addition to and/or in place of traditional texture sampling.

In the illustrated embodiment, programmable shader 160 provides region information in a request to TPU 165. The region information may identify a region of the texture such as a line, parallelogram, circle, ellipse, cube, parallelepiped, ovoid, etc. The region information may be specified using texture coordinates. For example, using a modification of OpenGL texture function above, the "vec texCoord" parameter may be replaced with a vector that specifies coordinates for a region rather than an individual sample point.

TPU 165, in the illustrated embodiment, is configured to sample the texture multiple times based on the region information and return attributes for the multiple samples to programmable shader 160. The shader program may then use the attributes for further processing. In some embodiments, the instruction/request from the programmable shader also specifies a number of samples N to be sampled in the region. In some embodiments, the request may also specify one or more LODs or one or more LOD biases for the samples. In some embodiments, TPU 165 is configured to automatically determine one or more LODs for the samples, e.g., based on the number of samples and the area of the region.

Texture processing circuitry configured to handle multi-fetch operations may allow for parallel sampling operations, which may improve performance. Depending on the amount of sample data, the samples may be streamed to a software-visible buffer as they are generated. This may also simplify programming for developers and may allow built-in support for noise parameters such as jitter, as discussed in further detail below.

As used herein the term "sample instruction" should be construed broadly according to its well-understood meaning in the art, which includes information that specifies that a sample operation should occur according to a particular application programming interface implemented by graphics processing hardware. In various disclosed embodiments, this information, rather than specifying a particular sample location as in conventional implementations, specifies a region within which a texture is to be sampled multiple times.

Figure 3A:
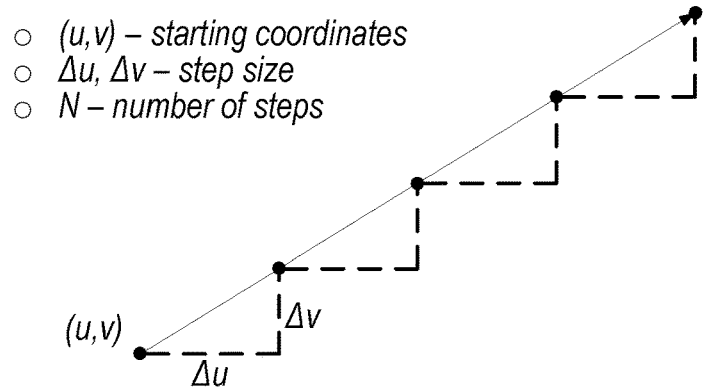
FIGS. 3A-3C are block diagrams illustrating exemplary region shapes specified by a multi-fetch sample operation.
Figure 3B:
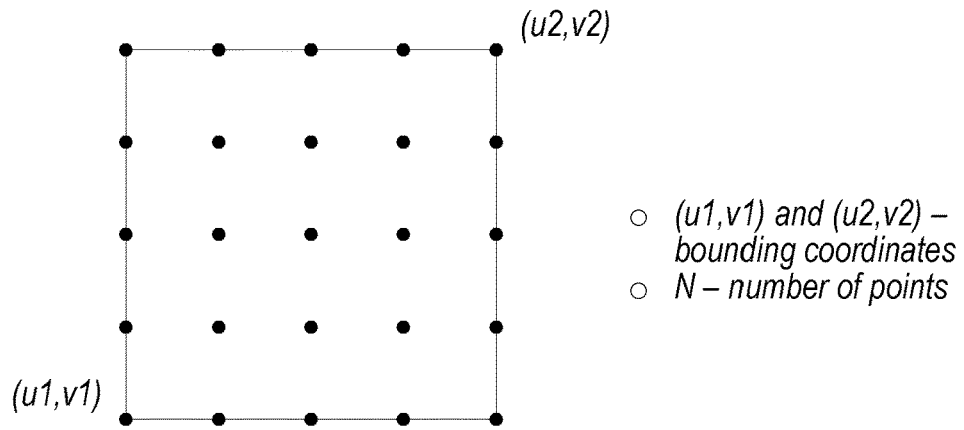
Figure 3C:
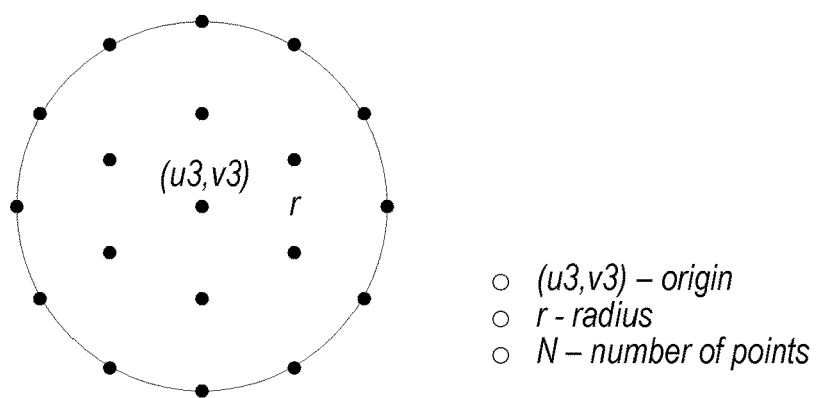

FIGS. 3A-3C illustrate exemplary regions specified by a multi-fetch sampling instruction, according to some embodiments. FIG. 3A shows a region corresponding to a line. In the illustrated embodiment, a sample instruction specifies starting coordinates (u,v), step sizes $\Delta u$ and $\Delta v$ and a number of steps/samples N. The illustrated line corresponds to N=5. In some embodiments, based on a sample instruction that specifies the illustrated parameters and N=5, TPU 165 is configured to provide attributes for five different samples along the line.

In some embodiments, TPU 165 is configured to add jitter offsets to sample points. For example, each point in FIG. 3A may be adjusted in one or more dimensions using jitter values to specify the amount of offset. The jitter values or jitter offsets may be determined using a look-up table (LUT) in some embodiments. In some embodiments, the jitter values of offsets may be generated using any of various appropriate pseudo-random techniques. In some embodiments, the API may support one or more jitter parameters that indicate whether jitter is to be added, dimensions in which jitter is to be implemented (e.g., x, y, LOD, etc.), the magnitude of jitter to be added, etc. This may simplify Monte Carlo sampling, for example, for graphics developers.

FIG. 3B, in the illustrated embodiment, illustrates a rectangular region specified using bounding coordinates (u1,v1) and (u2,v2) and a number of samples N. In the illustrated embodiment, N is 25. FIG. 3C, in the illustrated embodiment, illustrates a circular region specified using origin coordinates (u3,v3), radius r, and a number of points N. In various embodiments, other regions may be specified using various coordinates. For example, a parallelogram may be specified using an origin and a 2×2 matrix, etc.

The distribution of points may be determined using one or more equations specified by the API, for example, for a particular shape. For example, in FIG. 3A the next sample point may be defined as the current sample point plus $\Delta u$ and $\Delta v$, and steps may be performed while the number of steps is smaller than N. In various embodiments, the equations implemented by the API may provide a distributed set of points in the specified region, which may then be jittered, in some embodiments, based on one or more jitter parameters. This may provide desirable noise characteristics, e.g., for Monte Carlo techniques, in various embodiments.

In some embodiments, a sample instruction may also specify LOD information. For example, the sample instruction may specify an initial LOD and a change in LOD for each step. For embodiments that support trilinear filtering, for example, non-integer LOD values may be used for samples (e.g., by interpolating between mipmaps at different LOD levels). Consider, for example, a starting LOD of 7 and a change in LOD of −0.3 for each step. In this example, according to some embodiments, the first sample would be at LOD 7, the second at LOD 6.7, the third at LOD 6.4, and so on. In other embodiments discussed below, TPU 165 is configured to automatically determine a LOD.

In various embodiments, a sample instruction that specifies a region may include a parameter that specifies a shape of the region, which TPU 165 may use to determine how to pick sample points within the region (e.g., what equation to use). For example, TPU 165 may determine the locations of points for the shape in FIG. 3A using a different equation than for the shape in FIG. 3B.

Various embodiments are discussed herein with reference to 1, 2, 3, or more dimensions for illustrative purposes. The disclosed techniques may be applied to implementations in any of various appropriate dimensions for graphics processing. Further, the disclosed shapes of regions are included for illustrative purposes but are not intended to limit the scope of the present disclosure. Any of various appropriate shapes may be specified for multi-fetch regions in other embodiments.

Exemplary Pre-determined Sample Distributions

Often, sample distributions with the following properties are desirable: low discrepancy, isotropy, and irregularity. Low discrepancy means that the variance in the distance between different sets of neighboring samples is low. Isotropy means that the number of points that lie along any line, plane, or hyperplane is minimized. Said another say, the frequency content is rotationally invariant. Irregularity means that repeated patterns do not occur frequently within the distribution. Such distributions are sometimes referred to as having "blue noise" properties.

In some embodiments, graphics unit 150 is configured to store pre-determined sets of points in a canonical domain that have desired noise properties. In these embodiments, rather than using an equation to determine the location of sample points within a specified region, TPU 165 is configured to use one or more of the pre-determined sets of points to determine locations of samples for multi-fetch operations. In some embodiments, a graphics API may allow developers to specify a desired density of points or the density of points may be determined based on the specified desired number points N.

Figure 4:
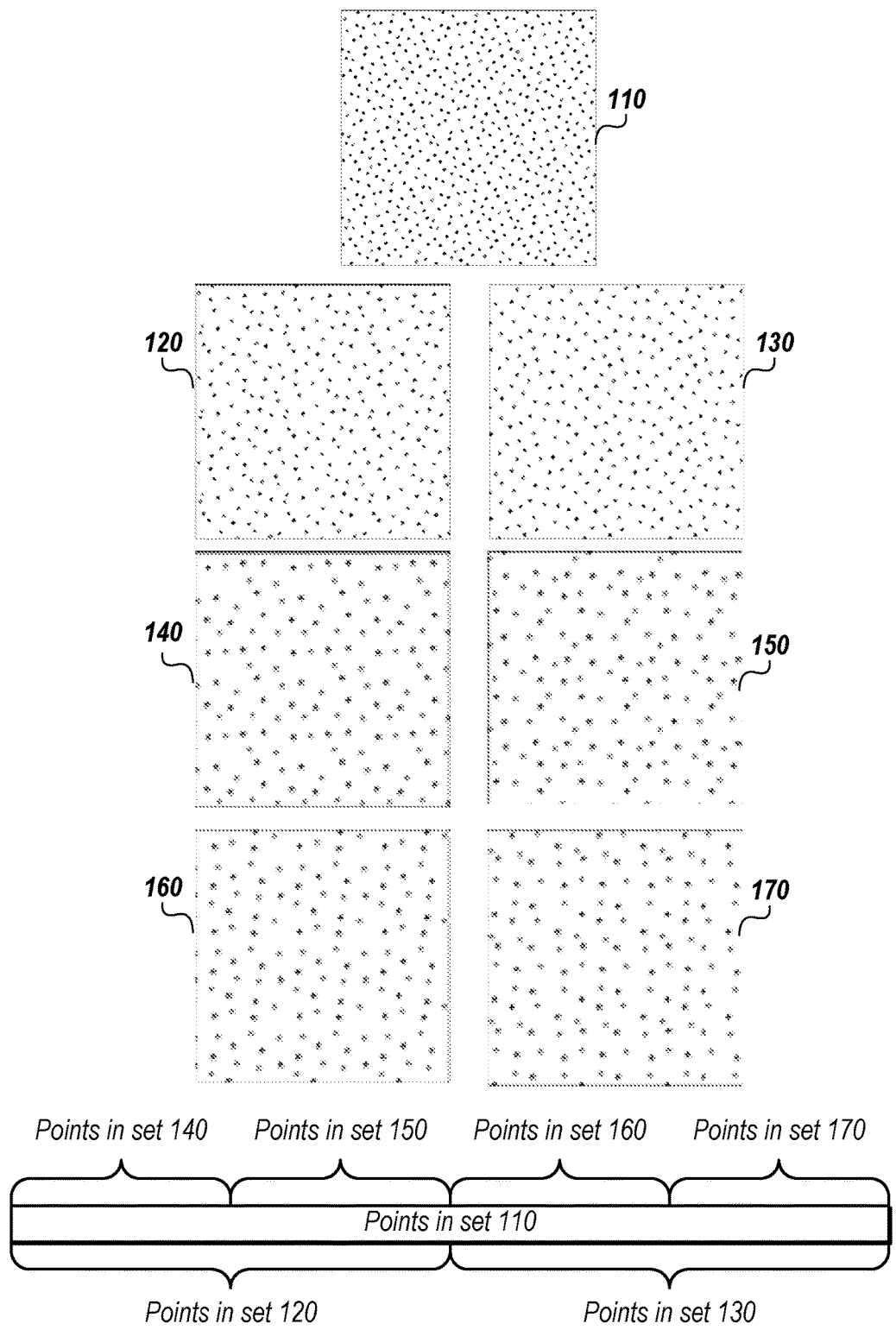
FIG. 4 illustrates an exemplary storage format for predetermined sets of samples points with desirable properties, according to some embodiments.

FIG. 4 illustrates an example organization of points in a set for different density levels. In the illustrated embodiment, sets of points are hierarchically arranged as aligned subsets such that, for a set of N points, a subset of size N/M begins on an index that is a multiple of N/M (where N and M are powers of two). For example, in FIG. 4, set 150 is a subset of 110. If set 110 contains 128 points (N=128) and set 150 contains 32 points then M=4, and sets of size N/M begin at index 0, 32, 64, and 96. In some embodiments, any aligned power-of-two subset of the total point set maintains desirable noise properties and is separately and concurrently accessible.

In the illustrated embodiment, sets 120 and 130 each include non-overlapping subsets of the points of set 110. Similarly, sets 140 and 150 each include non-overlapping subsets of the points of set 120 and sets 160 and 170 each include non-overlapping subsets of the points of set 130. In various embodiments, additional levels of points may be defined.

In some embodiments, TPU 165 is configured to use the pre-determined sets of distributions as sample locations for multi-fetch operations. For example, a shader program may indicate a sample count and an index into the pre-determined set of sample locations, indicating which aligned subset of sample points to use.

In some embodiments, TPU 165 is configured to transform the points to fit the specified region. In various embodiments, the samples in the table are defined in a canonical domain such as a unit square or a hypercube which may be transformed to various output domains corresponding to the specified region. Examples of output domains include uniform discs or ellipsoids, normally or Gaussian distributed discs, oriented parallelograms, line segments, etc.

For example, an oriented parallelogram may be defined by a 2×2 matrix. Simply multiplying the matrix by a normalized sample coordinate may result in non-uniform scaling of the point distribution in the case of high aspect rations. The right-hand portion of FIG. 5 shows the effects of such a transform. In some embodiments, a bounded differential aspect ratio technique is used to perform the transform illustrated on the left-hand side of FIG. 5, to produce a better distribution. In both illustrations, a regular grid of 8×8 points in a unit square is transformed. In various embodiments, stochastic sample points such as those shown in FIG. 4 may be transformed; the simple regular grid of FIG. 5 is used to facilitate illustration.

In some embodiments, the following GLSL shader code specifies the transform shown on the left-hand side of FIG. 5, where the RemapToPreserveAspectRatio function is configured to reduce anisotropic distortion:

```
vec2 ToParallelogram(vec2 p, vec4 gradient);
vec2 RemapToPreserveAspectRatio(vec2 ptInUnitSquare, vec4
gradient);
vec2 LowDiscrepancyTransform(vec2 p, vec4 gradient);
/// 'p' is a 2d point in the unit-square
/// 'gradient' is a jacobian matrix defining an arbitrary
parallelogram centered at the coordinate system origin
vec2 LowDiscrepancyTransform(vec2 p, vec4 gradient)
{
    return ToParallelogram(RemapToPreserveAspectRatio(p,
gradient), gradient);
}
vec2 ToParallelogram(vec2 p, vec4 gradient)
{
    float dudx = gradient.x; float dudy = gradient.z;
    float dvdx = gradient.y; float dvdy = gradient.w;
    float u = dudx * (p.x−0.5) + dudy * (p.y−0.5);
    float v = dvdx * (p.x−0.5) + dvdy * (p.y−0.5);
    return vec2(u, v);
}
vec2 RemapToPreserveAspectRatio(vec2 ptInUnitSquare, vec4
gradient)
{
    float dudx = gradient.x; float dudy = gradient.z;
    float dvdx = gradient.y; float dvdy = gradient.w;
    float xScale = sqrt(dudx*dudx + dvdx*dvdx);
    float yScale = (dudx * dvdy − dvdx * dudy) / xScale;
    float x = 0.0, y = 0.0;
    if (abs(xScale / yScale) >= 1)
    {
        float roundedAspectRoot = round(max(1, log2(abs(xScale /
yScale))));
        x = ptInUnitSquare.x / floor(roundedAspectRoot) +
floor(ptInUnitSquare.y * roundedAspectRoot) / roundedAspectRoot;
        y = fract(ptInUnitSquare.y * roundedAspectRoot);
    }
    else
    {
        float roundedAspectRoot = round(max(1, log2(abs(yScale /
xScale))));
        y = ptInUnitSquare.y / floor(roundedAspectRoot) +
floor(ptInUnitSquare.x * roundedAspectRoot) / roundedAspectRoot;
        x = fract(ptInUnitSquare.x * roundedAspectRoot);
    }
    return vec2(x, y);
}
```

Note that simply calling ToParallelogram may perform a matrix-vector multiply, which alone would produce the result on the right-hand portion of FIG. 5. The LowDiscrepancyTransform eventually calls ToParallelogram, but first applies the RemapToPreserveAspectRatio to the point, resulting in the more desirable transform on the left-hand portion of FIG. 5.

In some embodiments, TPU 165 includes circuitry configured to implement the functionality of the code sample above. In other embodiments, TPU 165 is configured to execute program instructions to achieve such functionality.

TPU 165, in various embodiments, is configured to perform a set of transforms for different region types (e.g., different shapes). In some embodiments, TPU 165 is configured to support shader programs that specify the shape or type of transform as a parameter of a multi-fetch instruction. The disclosed techniques may be used in any of various dimensions; the examples shown are for illustrative purposes and are not intended to limit the scope of the present disclosure.

In some embodiments, TPU 165 is configured to stream results back to the programmable shader 160 as they are determined. This may reduce hardware buffer sizes for sample data, in some embodiments. The programming model may expose buffer locations to the shader program to allow the shader program to read sample data as it is streamed, e.g., for integration operations. In other embodiments, the API may support multi-sample instructions with parameters for weight calculations and/or reduction operations for the integration and the programmable shader may perform the weighting and/or reduction based on the parameters (e.g., rather than requiring a user to program this functionality).

FIG. 6 is a block diagram illustrating circuitry included in TPU 165, according to some embodiments. In the illustrated embodiment, TPU 165 includes sample points table 610, transform circuitry 620, auto-LOD circuitry 630, and sample fetch circuitry 640. In other embodiments, TPU 165 may include any of various elements in addition to and/or in place of those illustrated.

Sample points table 610, in some embodiments, is configured to store one or more pre-determined sample point distributions, e.g., as discussed above with reference to FIG. 4. In some embodiments, this table is configured to receive parameters 605, including a number of points and an index from programmable shader 160 and provide sample points based on these inputs. These parameters may be specified by a shader program. In some embodiments, a shader program may also bypass the sample points table and provide texture coordinates to transform circuitry 620 or sample fetch circuitry 640 directly.

Transform circuitry 620, in some embodiments, is configured to transform sample point locations corresponding to texture coordinates 625 and/or based on region information in parameters 605. In embodiments in which texture coordinates from the shader program are used, transform circuitry 620 may be configured to determine sample locations within the specified region without accessing sample points table 610. Transform circuitry 620 and/or sample fetch circuitry 640 may also be configured to perform jitter operations to adjust texture coordinates.

Auto-LOD circuitry 630, in the illustrated embodiment, is configured to receive transformed texture coordinates 635 and generate a LOD in a texture that utilizes mipmapping, e.g., based on the area of the specified region and the number of points.

In some embodiments, TPU 165 is configured to automatically determine the LOD using the following equation based on the area of the post-transform domain and the sample count. The calculation of the area may be a function of the region type, and may be, for example, the cross product for a parallelogram, PI times the radius squared for a circle, PI times the semi-minor axis times the semi-major axis for an ellipse, etc. In some embodiments, TPU 165 is configured to use the following equation to determine the LOD:

$$lod = \frac{1}{4}\log_2\left(\left(\frac{\text{Area}}{N}\right)^2\right)$$

where N is the number of samples and "Area" is the area of the specified region in the post-transform domain.

In other embodiments, TPU 165 may simply use LOD 0 for multi-fetch requests or a shader program may specify one or more LODs for multi-fetch operations.

Sample fetch circuitry 640, in the some embodiments, is configured to sample the texture via memory interface 180 based on the texture coordinates and LOD 645 (or a LOD provided by programmable shader 160) and provide pixel attributes (e.g., color attributes) and coordinates 655 to programmable shader 160. In some embodiments, sample fetch circuitry 640 is configured to stream the samples and/or the coordinates as they are generated. In some embodiments, sample fetch circuitry is configured to perform multiple sample operations in parallel. In the illustrated embodiment, the output information includes coordinates that indicate the sample location for each sample. This may be important information for the shader program, in various embodiments in which the shader program does not specify sample locations, because the shader program is relying on TPU 165 to determine sample locations and otherwise would not have knowledge of the locations.

In various embodiments, circuitry shown in FIG. 6 may be omitted. For example, sample points table 610 may be omitted in embodiments in which pre-determined distributions are not used. In these embodiments, transform circuitry 620 may simply be used to determine the locations of sample points within the specified region, e.g., based on a formula. In some embodiments, transform circuitry 620 may be omitted. In embodiments in which a fixed LOD is used and/or a LOD is specified by the shader program, auto-LOD circuitry 630 may be omitted. Other elements may be added in various embodiments. The particular configuration of FIG. 6 is shown for illustrative purposes but is not intended to limit the scope of the present disclosure.

Exemplary Method

FIG. 7 is a flow diagram illustrating a method 700 for sampling a texture multiple times within a specified region, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Flow begins at 710.

At 710, in the illustrated embodiment, a graphics processor processes a graphics instruction that includes region information. The graphics instruction may also specify a number of samples. The processing may include decoding the graphics instruction, determining that the instruction specifies a region, transmitting the instruction to TPU 165, etc. In the illustrated embodiment, the region information specifies a region of a texture using texture coordinates. In various embodiments, the instruction requests pixel attributes that are based on multiple samples of the graphics texture that correspond to the specified region.

At 720, in the illustrated embodiment, the graphics processor samples the texture multiple times using coordinates within the shader-specified region of the texture to generate attributes for multiple samples. The attributes may specify color information, e.g., using R, G, B, A channels, in some embodiments. The graphics processor may determine the sample locations based on an equation (which may be selected based on the type of region, e.g., its shape or how its coordinates are specified), based on pre-determined sample distributions, e.g., as shown in FIG. 4, and/or using pseudo-random techniques, in various embodiments.

At 730, in the illustrated embodiment, the graphics processor provides information corresponding to the multiple samples for processing. In the illustrated embodiment, the processing is based on one or more other instructions in a graphics program that includes the graphics instruction. Said another way, the sample information may be made available to a shader program. The information may be raw sample information (e.g., pixel/texel attributes) or may be further processed. For example, the graphics processor may integrate the samples and the provided information may be the output of the integration. Integration is discussed for illustrative purposes, but any of various further processing operations may be performed, in some embodiments, prior to providing the information for the samples to the graphics program.

Exemplary Device

Referring now to FIG. 8, a block diagram illustrating an exemplary embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820, input/output (I/O) bridge 850, cache/memory controller 845, graphics unit 150, and display unit 865.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and/or caches. For example, compute complex 820 may include 1, 2, or 4 processor cores, or any other suitable number. In one embodiment, cache 830 is a set associative L2 cache. In some embodiments, cores 835 and/or 840 may include internal instruction and/or data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

Cache/memory controller 845 may be configured to manage transfer of data between fabric 810 and one or more caches and/or memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 150 may be described as "coupled to" a memory through fabric 810 and cache/memory controller 845. In contrast, in the illustrated embodiment of FIG. 8, graphics unit 150 is "directly coupled" to fabric 810 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes programmable shader 160 and TPU 165.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and/or low-power always-on functionality, for example. I/O bridge 850 may also include interfaces such as pulse-width modulation (PWM), general-purpose input/output (GPIO), serial peripheral interface (SPI), and/or inter-integrated circuit (I2C), for example. Various types of peripherals and devices may be coupled to device 800 via I/O bridge 850.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   decode circuitry configured to process a graphics instruction that specifies a number of samples to be performed and includes region information that specifies a region of a texture;
   texture processing circuitry configured to, in response to the graphics instruction:
      determine a plurality of sample locations within the specified region of the texture;
      sample the texture at the plurality of sample locations, including, for multiple ones of the sample locations, performing separate filtering operations to determine multiple sample outputs corresponding to the multiple sample locations, wherein the filtering operations are each based on multiple texels near a corresponding one of the multiple sample locations; and
      provide the multiple sample outputs for processing based on one or more other instructions in a graphics program that includes the graphics instruction.

2. The apparatus of claim 1, wherein the specified region is at least one of: a line, a circle, or a parallelogram.

3. The apparatus of claim 1, wherein the texture processing circuitry is configured to generate at least a portion of the multiple sample outputs in parallel.

4. The apparatus of claim 1, wherein texture processing circuitry is configured to determine sample locations for the samples based on a predetermined equation and the region information.

5. The apparatus of claim 4, wherein the texture processing circuitry is configured to apply jitter offsets to the determined sample locations of the samples prior to sampling.

6. The apparatus of claim 4, wherein the predetermined equation includes one or more level-of-detail parameters.

7. The apparatus of claim 1, wherein the texture processing circuitry is configured to stream pixel attributes corresponding to the samples, as the samples are generated, to one or more storage elements that are accessible to the graphics program.

8. The apparatus of claim 1, wherein the texture processing circuitry is configured to stream sample points for the samples, as the samples are generated, to one or more storage elements that are accessible to the graphics program.

9. The apparatus of claim 1, wherein the texture processing circuitry is configured to determine sample locations of the samples corresponding to the region using stored sets of points that meet one or more randomness criteria, wherein the stored sets of points are hierarchically arranged such that aligned subsets of consecutive points also meet the one or more randomness criteria.

10. The apparatus of claim 1, wherein the texture processing circuitry is configured to automatically select one or more levels of detail at which to sample the texture based on the size of the specified region and density of sample points in the specified region.

11. A method, comprising:
    processing a graphics instruction that specifies a number of samples to be performed and includes region information that specifies a region of a texture using texture coordinates;
    determining a plurality of sample locations within the specified region of the texture;
    sampling the texture at the plurality of sample locations, including, for multiple ones of the sample locations, performing separate filtering operations to determine multiple sample outputs corresponding to the multiple sample locations, wherein the filtering operations are each based on multiple texels near a corresponding one of the multiple sample locations; and
    providing the multiple sample outputs for processing based on one or more other instructions in a graphics program that includes the graphics instruction.

12. The method of claim 11, wherein the determining the sample locations is performed using an equation that is selected based on a shape corresponding to the specified region.

13. The method of claim 11, wherein the specified region is at least one of: a line, a circle, or a parallelogram.

14. The method of claim 11, further comprising:
    applying jitter offsets to the determined sample locations of the samples prior to the sampling.

15. The method of claim 11, further comprising streamlining one or more of pixel attributes corresponding to the samples or sample points for the samples, as the pixel attributes or samples are generated, to one or more storage elements that are accessible to the graphics program.

16. A non-transitory computer-readable medium having instructions stored thereon that are executable by a computing device to perform operations comprising:
    providing, to texture processing circuitry based on a graphics instruction that specifies a number of samples to be performed and includes region information that specifies a region of a texture, a request for a plurality of samples from a graphics texture, wherein the request specifies the region information using texture coordinates;
    receiving, from the texture processing circuitry, a response to the request from texture processing circuitry, wherein the response includes information corresponding to multiple sample outputs generated by sampling the texture a plurality of determined sample locations within the specified region, including, for multiple ones of the sample locations, performing filtering to determine a corresponding sample output for the sample location based on multiple texels near the sample location; and
    processing the multiple sample outputs based on one or more other ones of the instructions.

17. The non-transitory computer-readable medium of claim 16, wherein the specified region is a circle.

18. The non-transitory computer-readable medium of claim 16, wherein the sample locations for the samples are determined based on a predetermined equation and the region information.

19. The non-transitory computer-readable medium of claim 16, wherein jitter offsets are applied to the determined sample locations prior to sampling.

20. The non-transitory computer-readable medium of claim 16, wherein the processing includes accessing streamed pixel attributes corresponding to the samples from one or more storage elements as they are generated.

* * * * *